R. E. BARTELS.
PROCESS OF PREPARING SOLES.
APPLICATION FILED JAN. 5, 1918.
Reissued Mar. 18, 1919. 14,611.
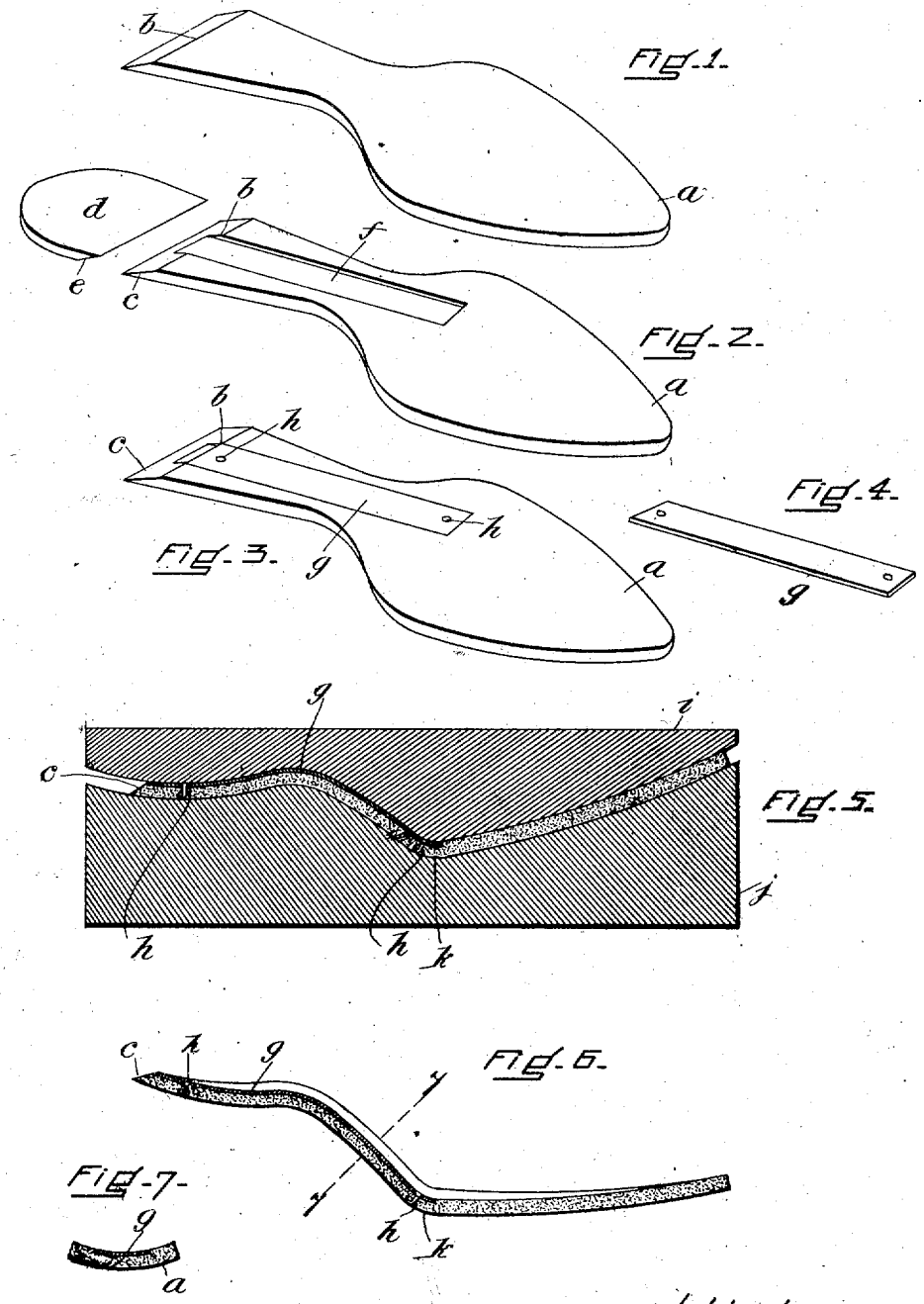
INVENTOR.
R. E. BARTELS
BY Kerr & Brown Simmons & May
ATTORNEYS.

UNITED STATES PATENT OFFICE.

REINHARD E. BARTELS, OF WINCHESTER, MASSACHUSETTS.

PROCESS OF PREPARING SOLES.

14,611. Specification of Reissued Letters Patent. Reissued Mar. 18, 1919.

Original No. 1,237,152, dated August 14, 1917, Serial No. 161,128, filed April 11, 1917. Application for reissue filed January 5, 1918. Serial No. 210,569.

*To all whom it may concern:*

Be it known that I, REINHARD E. BARTELS, a citizen of the United States, and a resident of Winchester, in the county of Middlesex and State of Massachusetts, have invented certain new and useful Improvements in Processes of Preparing Soles, of which the following is a specification.

This invention relates to the manufacture of footwear and has for its object to provide certain improvements in the manipulation and treatment of the sole prior to its attachment to the partially formed shoe, in consequence of which a better fitting shoe may be secured.

In the manufacture of a shoe, after the sole has been cut from the leather, it is subjected to several operations; that is, it is channeled, and then, when in temper, it is molded so as to approximate the shape of the bottom of the last and to approximate the shape which it is intended to have in the shoe itself. After the molding operation, the channel flap is raised in order that the line of stitches which attach the sole to the shoe may be passed through the channel. It is customary with many kinds of footwear to provide the sole with a shank stiffener, that is, a strip of relatively unyielding material which extends forwardly from the heel to a point approximately under the ball of the foot. This stiffener is usually assembled with the sole immediately prior to the attachment of the sole to the welt or to the upper. It frequently happens that the stiffener, in the manipulation of the parts, becomes misplaced and it more frequently happens that the shape of the stiffener does not accurately conform to the shape of the molded sole. For the various operations incident to opening the channel flap and the like, it is necessary that the sole should be wet or moistened, and consequently, although a sole may be perfectly shaped by the molding operation, the subsequent dampening of the sole and the manipulations to which the sole is subjected, all have the effect of distorting the sole and causing it to assume a flattened condition.

The object of my invention is to overcome the difficulties which have heretofore been experienced in molding and preserving the shape of the sole and in insuring the proper location of the shank stiffener.

In accordance with my invention, I preferably employ as a shank stiffener thin sheet metal, such for example as sheet iron, or the like. After the sole has been shaped and its under face channeled in the ordinary way, and while the sole is flat, I secure thereto the shank stiffener in the location that is desirable. The sole, with its attached shank stiffener, is then subjected to a molding operation as a result of which both the sole and the shank stiffener are simultaneously molded into proper shape. For this purpose, I find it convenient to employ metallic molds capable of exerting sufficient pressure to give to the shank stiffener the desired curvature both longitudinally and transversely. After a sole and a shank stiffener have thus been molded, they both preserve their molded shape notwithstanding the manipulations to which the sole subsequently may be subjected.

Referring to the drawings,—

Figure 1 illustrates a shaped sole.

Fig. 2 represents the same after it has been subjected to a grooving operation; that is, after it has been subjected to an operation by which a shallow groove adequate to receive the shank stiffener has been formed in the shank of the sole.

Fig. 3 illustrates the sole with the shank secured in place.

Fig. 4 shows the shank stiffener detached.

Fig. 5 shows in section two molds and the sole and the shank stiffener during the operation of molding.

Fig. 6 illustrates in longitudinal section the molded sole.

Fig. 7 represents a cross section through the shank on the line 7—7 of Fig. 6.

I have selected for illustration a sole *a* which at its rear end terminates short of the extremity of the heel; that is to say, its rear end *b* is straight, so that what I may term a heel extension may be secured thereto. The sole is channeled on its under face as ordinarily, although I have not illustrated the channel. The rear end may then be skived as at *c* for the attachment of the heel extension *d* which may likewise be skived at *e*. By means of a suitable grooving machine, I form in the shank and partway into the ball of the sole a shallow groove *f* in which the shank stiffener *g* may be located and secured by fastenings *h*. After the shank stiffener has been secured in place, the sole is then molded as ordinarily my metal molds indicated at *i* and *j*. The pressure of the mold is sufficient, not only to mold the sole to the desired form, but also to impart to the stiffener *g* the desired shape. After the molding operation is completed, it will be observed that the shank stiffener *g* is not only curved longitudinally as shown in Fig. 6, but is also curved transversely as shown in Fig. 7, so that the sole and stiffener will accurately conform to the bottom of the last on which the shoe is to be formed. Inasmuch as the sole is grooved to receive the stiffener, I thereby eliminate any projection or hump on the under side of the shank of the sole in the finished shoe.

After the sole has been molded into proper shape, the heel extension *d* may be secured to a sole by staples or other suitable fasteners. Of course it will be understood that the invention is not limited to a process of molding an incomplete sole, as a sole of sufficient length to extend between the extremities of the shoe may be molded in accordance with the present invention. Preferably the shank piece is of such length that its front end extends to the "break" *k* in the sole, as shown both in Figs. 5 and 6.

The advantages of my method of forming shoe soles will be readily appreciated by those skilled in the art, and it is hardly necessary to advert thereto. I may, however, call attention to that fact that, by simultaneously molding both the shank stiffener and the sole, I effect a material saving inasmuch as I perform in one operation what has heretofore called for two operations; that is to say, it has heretofore been customary to mold the shank piece separately and to mold the sole separately, and then to assemble them. Another advantage, to which I might call attention, is that I secure for each shoe an exact conformation of the sole and the shank piece, and I also insure the location of the shank in its true position and prevent any shifting or dislocation thereof.

After the sole has been once molded, it may be subsequently dampened to permit the turning of the channel without causing any distortion of the molded sole, since the shank piece holds it firmly in the shape to which it has been molded.

Having thus explained the nature of my said invention and described a way of making and using the same, although without attempting to set forth all of the forms in which it may be made or all of the modes of its use, what I claim is:

1. The herein described process which consists of assembling a sole and a sheet metal shank stiffener and then simultaneously molding the sole and shank stiffener to the desired longitudinal and transverse curvature prior to their being assembled in the shoe, the shank stiffener being rendered rigid and unyielding by such molding.

2. The herein described process which consists in first longitudinally grooving a shoe sole, then inserting and securing a shank stiffener of moldable material in the groove, and finally by pressure molding the sole and shank stiffener to the desired curvature.

3. The herein described process which consists first in shaping and channeling a sole, then attaching to the upper face of the sole a moldable metallic shank stiffener, then simultaneously by pressure molding the sole and shank stiffener to the desired shape, and then turning back the channel flap.

4. The herein described process which consists in assembling a sole and a metallic shank stiffener, and then simultaneously molding the sole and metal shank stiffener to the desired shape prior to their being assembled in the shoe.

5. The herein described process which consists in longitudinally grooving the shank of a shoe sole, placing a shank stiffener of moldable metal in the groove, and by pressure simultaneously molding the sole and shank stiffener to the desired shape and curvature.

6. The herein described process which consists in longitudinally grooving the shank of a shoe sole, placing a shank stiffener of moldable metal in the grove, securing said stiffener to said sole, and by pressure simultaneously molding said sole and shank stiffener into the desired longitudinal and transverse curvature.

7. That improvement in methods of preparing soles which consists in cutting away a portion of the sole at the shank, applying a metal shank stiffening element to the reduced portion of the sole, and then molding the shank to the desired shape, all prior to assembling the sole with the shoe.

8. That improvement in methods of preparing soles which consists in applying to the shank of a shaped sole, a flat metallic shank stiffener, then simultaneously molding the sole and stiffener to impart both a longitudinal and transverse curvature to the shank of the sole and the shank stiffener, all prior to their being assembled in the shoe.

In testimony whereof I have affixed my signature.

REINHARD E. BARTELS.